Sept. 23, 1969         H. KOCH         3,468,518
KNEADING AND MIXING DEVICE FOR PROCESSING MATERIAL
IN PASTY CONDITION
Filed Feb. 28, 1968         3 Sheets-Sheet 3

INVENTOR
HEINZ KOCH

BY Hane and Baxley
ATTORNEYS

United States Patent Office 3,468,518
Patented Sept. 23, 1969

3,468,518
KNEADING AND MIXING DEVICE FOR PROCESSING MATERIAL IN PASTY CONDITION
Heinz Koch, Ludwigsburg, Germany, assignor to Werner & Pfleiderer, Stuttgart-Freuerbach, Germany, a company of Germany
Filed Feb. 28, 1968, Ser. No. 709,095
Claims priority, application Germany, May 3, 1967, W 43,905
Int. Cl. B01f 7/08; B29h 1/00
U.S. Cl. 259—6                                10 Claims

ABSTRACT OF THE DISCLOSURE

A kneading and mixing device for processing material in pasty condition, particularly highly viscous material, in which the material is processed in a chamber closed at opposite ends by end walls and including mutually parallel, rotary mixing shafts cross-sectionally enlarged toward opposite ends. An elongate kneading cam spirally encompasses each of said shafts, material fed into the chamber being conveyed by the cams toward the enlarged ends of the shafts, that is, in the opposite directions.

---

The invention relates to a kneading and mixing device for processing material in pasty condition such as highly viscous material and more particularly to a kneading and mixing device with a kneading and mixing chamber in which two mutually parallel mixing shafts with spiral kneading cams or threads thereon are rotatable for conveying material fed into the chamber.

Kneading and mixing devices of the general kind above referred to are used for kneading and mixing of, for instance, caoutchouc or other rubber-like masses.There are widely known and used in the industry, devices sometimes referred to as internal mixing devices in which the two mutually parallel mixing shafts are horizontally journalled in a chamber. The chamber itself is closed off by a back-fall or trap door in the bottom wall of the chamber. This door when opened serves as discharge opening. The material to be processed is fed into the chamber by a chute communicating with the top wall of the chamber. A piston slidable in the chute closes the top wall of the chamber when the device is in operation.

There are also known kneading and mixing devices the mixing shafts of which mount scoops or paddles having several vanes. These scoops convey the material substantially toward the mid-portion of the chamber when the device is in operation. It has been found that material closely adjacent to the end walls of the mixing chamber does not fully participate in the flow of the material within the chamber when the rotational speed of the mixing shafts mounting the scoops is above a certain rotational speed. In other words, the material to be processed dwells primarily within the middle portion of the chamber. Such localized mixing and kneading of the material becomes the more pronounced the higher the rotational speeds ofthe mixing shafts are.

In modern practice it is customary for economic reasons to operate internal mixers of the type above referred to at higher operational speeds to reduce the periods of time for which the material must be processed as much as possible. Such possibility of reducing the required operational time is one of the principal advantages of internal mixers using shafts with scoops thereon in comparison with devices using mixing shafts used for the same purpose.

Devices using mixing shafts with spirally elongate kneading cams thereon show the same disadvantage of a localized kneading and mixing of the material in the chamber, the more so, as the kneading cams generally have only very few turns due to the required steep pitch and the comparatively small size of the chambers as are generally used in such devices. Attempts have been made to eliminate localized kneading and mixing by meshing the cams on the shafts but such attempts were unsuccessful. Moreover, intermeshing cams are not always desirable.

As is evident, localized mixing and kneading as previously described, results in an insufficient homogenization of the material and the formation of lumps of one or the other of the components of the mixtures, sometimes to an extent such that the effectiveness of mixers as previously referred to, becomes questionable.

It is an object of the invention to provide a novel and improved kneading and mixing device of the general kind above referred to in which the entire material fed into the mixing and kneading chamber of the device is thoroughly and intimately mixed so that the processed material is fully homogenized, or in other words so that the formation of lumps of one or the other of the components is avoided.

It is also an object of the invention to provide a novel and improved kneading and mixing device of the general kind above referred to which can be operated with considerably higher rotational speeds of the mixing shafts than devices of this kind hereinbefore known without reducing the thoroughness of the kneading and mixing of the material in the chamber of the device.

Still another object of the invention is to provide a novel and improved kneading and mixing device of the general kind above referred to in which in intensive and smooth circulatory flow of the entire material in the chamber is positively obtained and the material is forced to flow back and forth between the mixing shafts in the chamber.

The aforepointed out objects, features and advantages of the invention and other objects, features and advantages which will be pointed out hereinafter are obtained by gradually increasing the cross-sectional area of each mixing shaft in the conveying direction of the spirally elongate kneading cams mounted on the shafts, and by arranging the flow directions of the material in countercurrent.

Depending upon the specific constructive requirements the counter-flow of the material in the chamber can be obtained by either rotating the shafts in opposition and arranging the cams thereon for conveying the material in the same direction, or rotating the shafts in the same direction and arranging the cams thereon for conveying in opposition.

It has been found that a particularly uniform kneading and mixing of the material can be obtained by providing in the kneading cam on one or preferably on both shafts, a recess closely adjacent to the end wall of the chamber facing the enlarged end of the respective shaft, that is, the upstream end wall. Such recess may be conveniently obtained by terminating the respective cam or both cams at a selected distance from the respective end wall. Due to the provision of a recess at the cam end adjacent to the upstream end wall, stagnation or deceleration of material adjacent to such end wall is prevented. This is particularly important when the material to be kneaded and mixed is thermally sensitive. The quality of such material may markedly deteriorate due to prolonged dwelling in one part of the chamber as such prolonged dwell time may cause a substantial increase in the temperature of the material.

Stagnation of material adjacent to the upstream wall of the chamber can also be prevented by interposing in the cam closely adjacent to the upstream end wall a cam portion having a comparatively low pitch and disposed to convey material in opposition to the conveying direction of the cam proper. As a result, material reaching the oppositely conveying cam portion is forced back into the main body of the material in the chamber thereby improving the circulatory flow of the material and thus the homogenization thereof.

It has been found that materials which are sticky or have similar adhesive properties tend to adhere themselves, at least temporarily, to wall portions of the chamber which are adjacent to the aforedescribed recesses in the cams. To avoid such adherence of residual material on walls of the chamber, the invention proposes to provide on one or on both mixing shafts stripping means extending from the point of largest diameter of the respective shaft toward the other end thereof. The outer edge such stripping means is preferably in axial alignment with the peripheral outline of the largest diameter of the mixing shaft. The axial length of the stripping means may substantially correspond to the axial length of the recess in the cam. Stripping means of this kind in conjunction with the action of the recesses further improve the circulatory flow of the material in the chamber. If the cam means comprise several circumferentially displaced, spirally elongate cams the stripping means may be in the form of two ribs disposed between the respective ends of the cams. However, in some cases, one rib is sufficient.

In the accompanying drawing several preferred embodiments of the invention are shown by way of illustration and not by way of limitation.

Figure 1:
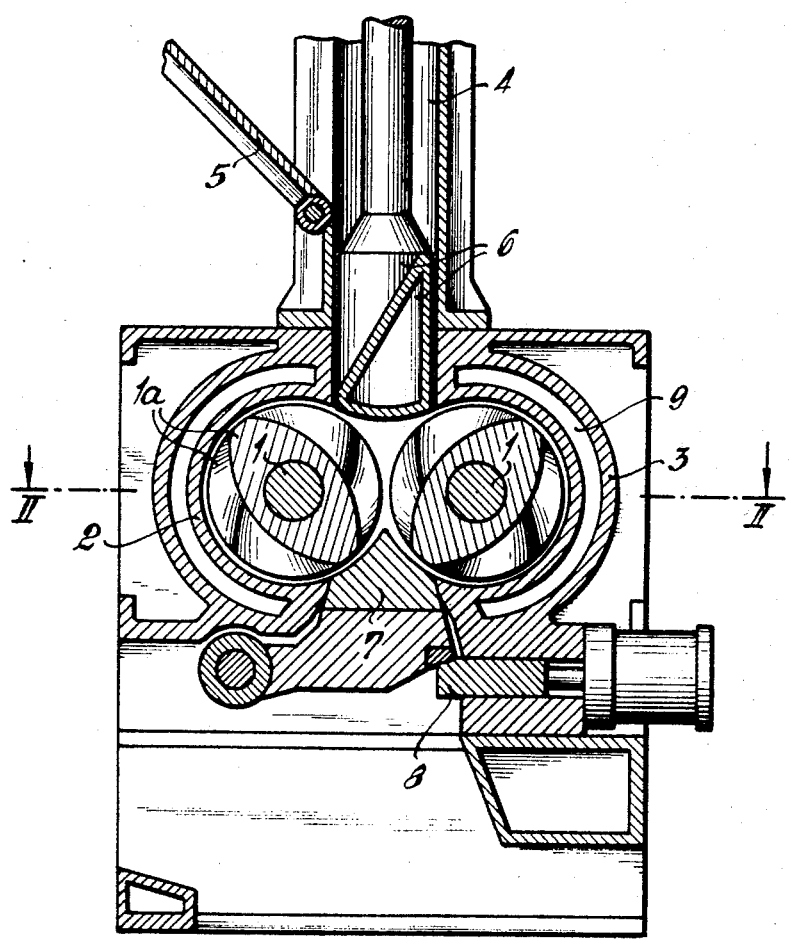
FIG. 1 is a diagrammatic elevational sectional view of a kneading and mixing device according to the invention.
Figure 2:
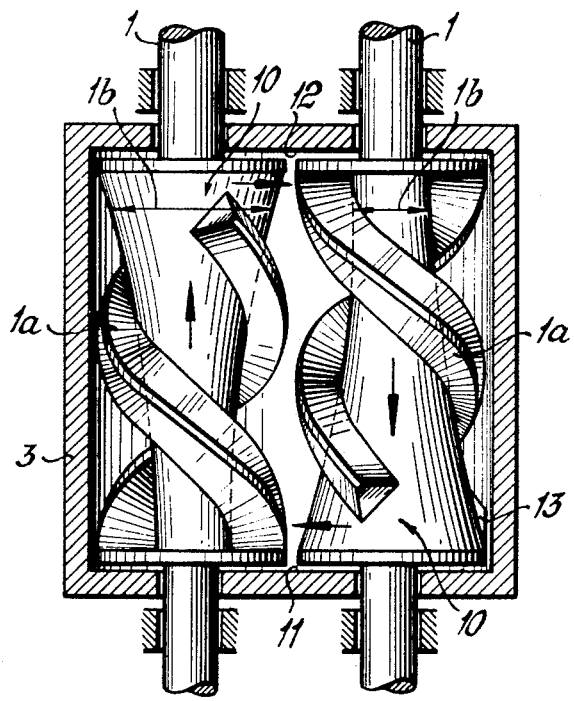
FIG. 2 is a partial section taken on line II—II of FIG. 1, some components of the device shown in FIG. 1 being omitted to simplify the illustration.

Referring first to FIGS. 1 and 2 in detail, the exemplified mixing and kneading device comprises two mixing shafts 1 which are disposed in a chamber 2 of a casing 3 in mutually parallel and horizontal relationship.

The drive means for the shafts are not shown in detail, for they should be assumed to be conventional. It is further assumed that the two shafts are rotated in opposition preferably with a slight differential in the rate of rotation as such differential increases the efficiency of the kneading and mixing action. Each shaft mounts thereon two circumferentially spaced elongate kneading cams spirally encompassing the respective shaft suitably secured thereon or integral therewith. However, only one cam on each shaft may be provided. As is clearly shown in FIGS. 1 and 2, the cams on the shafts are tangentially disposed with reference to each other, that is, they do not intermesh. The hand of the cams on the oppositely rotating shafts is the same and accordingly, material fed into the chamber 2 as described hereinafter is conveyed in counterflow. The same result can, of course, also be obtained by arranging the cams for conveying in opposite direction and rotating the shafts in the same direction. The arrows in FIG. 2 indicate the circulatory flow of the material within the chamber.

As is shown in FIG. 2 both shafts are gradually increased in diameter toward the upstream end wall of the chamber. The upstream end wall for the left hand shaft is the upper end wall as shown in FIG. 2 and the upstream end wall for the right hand shaft is the lower end wall as shown in FIG. 2. The diameters referred to are indicated at 1b.

Cooling ducts 9 are preferably included in the wall of casing 3.

Material to be processed is fed into the chamber through a chute 4 and is guided into the duct by a pivotal gate 5. A plunger 6 may be moved up and down in the chute by conventional means (not shown) suitable for the purpose. The plunger is shown in its lowered position in which it constitutes part of the top wall of the mixing chamber as is clearly apparent from FIG. 1. To charge the chamber, the plunger is lifted into a position above gate 5 whereupon material can be freely fed into the chamber.

Discharge of processed material from the mixing chamber is effected by means of a saddle-like trap door 7 in the bottom wall of the chamber. The trap door is shown in its closed position. As is readily evident, it can be released by actuating a solenoid 8. Retraction of the core by energization of the solenoid releases the trap door. The core will lock the trap door in its closed position when the solenoid is de-energized as is shown.

FIG. 2 shows a recess 10 at the end of each cam adjacent to the respective upstream end wall. Each recess is obtained by terminating the cam short of the upstream end wall. At the other end, the cams are continued to a point closely adjacent to the downstream end wall.

The provision of recesses 10 prevents or at least impedes stagnation and accumulation of material in gaps 11 and 12 between the upstream end walls and the respective enlarged end faces of the shafts. As pointed out before, an increased dwell time of material in a localized area of the chamber is particularly harmful when the material is sensitive to temperature.

FIG. 2 further shows a stripper blade 13 on one of the mixing shafts. As pointed out before, the provision of such stripper blade is particularly useful if the material to be processed such as sticky material, tends to adhere to the peripheral wall of casing 3 in the comparatively narrow gaps between the walls and the adjacent enlarged shaft ends. Several such stripper blades may be provided on one or both enlarged shaft ends.

Figure 3:
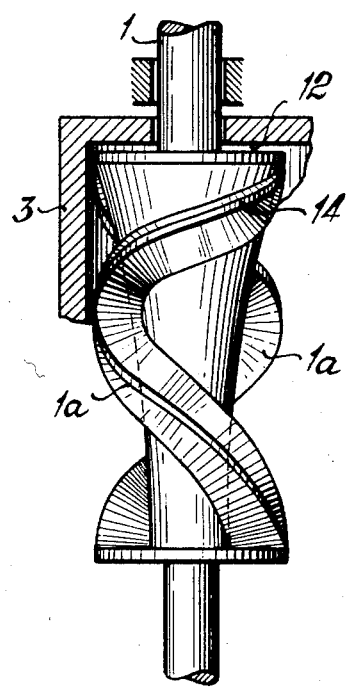
FIG. 3 is a fragmentary diagrammatic view of a modification of the kneading means of the device.

Referring now to FIG. 3, the general structure of the device according to this figure should be visualized as being the same as shown in FIGS. 1 and 2 and described in connection therewith, except that prevention of stagnation of material adjacent to the upstream end walls in the chamber is not obtained by recesses but by providing one or several cam portions 14 which preferably have a lower pitch than the main portion of the cams on the shafts and convey in opposition to the conveying direction of the main portions. As a result, the cam portions 14 force material coming within the reach thereof toward the mid-portion of the chamber and thus into the circulatory flow of the material in the chamber.

The counteracting cam portions are disposed contiguous with the main portions of the cams 1a.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A kneading and mixing device for precessing of material in pasty condition, said device comprising in combination:

a casing including a kneading and mixing chamber having oppositely disposed end walls;

a pair of rotary parallel mixing shafts extending within said chamber between the end walls thereof, the cross-sectional areas of said shafts being gradually enlarged toward opposite ends thereof;

an elongate cam means on each of said shafts spirally encompassing the same;

each of said cam means conveying material fed into the chamber toward the enlarged end of the respective shaft;

feed means for feeding material into the chamber; and discharge means for discharging material from the chamber.

2. The device according to claim 1 wherein at least one of said cam means terminates short of the end wall of the casing adjacent to the enlarged end of the shaft.

3. The device according to claim 1 wherein each of said spirally elongate cam means has adjacent to the end wall of the casing facing the enlarged end of the respective shaft a portion the conveying direction of which is opposite to that of the main portion of the respective cam means.

4. The device according to claim 3 wherein the pitch of each of said opposing cam portions is less than the pitch of the main portion of the respective cam means.

5. The device according to claim 1 wherein said spirally elongate cam means comprise two circumferentially displaced cams on each shaft.

6. The device according to claim 1 and comprising an axially elongate stripper blade extending from the enlarged end of at least one of said shafts in axial alignment with the largest diameter thereof.

7. The device according to claim 6 wherein the radially outer edge of said stripper is parallel to the juxtaposed wall of the casing and closely adjacent thereto.

8. The device according to claim 1 wherein said feed means comprise a chute leading into the chamber, and a piston movable between a lowered position closing the chute entrance into the chamber and a raised position opening the chute entrance into the chamber for feeding material into the same.

9. The device according to claim 1 wherein said discharge means comprise a trap door hinged to the base wall of the casing, and actuating means coacting with said trap door to release the same for movement into and out of a closed position and for locking the trap door in the closed position.

10. The device according to claim 1 wherein the conveying directions of said spirally elongate cam means and the rotational directions of said shafts are such that the material is conveyed in counter-current in the casing.

References Cited

UNITED STATES PATENTS

| | | | |
|---|---|---|---|
| 2,231,911 | 2/1941 | Hitt et al. | 259—104 |
| 2,707,621 | 5/1955 | Peiler | 259—6 XR |
| 2,985,909 | 5/1961 | Smith et al. | 259—104 XR |
| 2,994,100 | 8/1961 | Comes et al. | 259—104 XR |

WALTER A. SCHEEL, Primary Examiner

JOHN M. BELL, Assistant Examiner

U.S. Cl. X.R.

259—104; 18—2